May 10, 1932.  B. A. OBST  1,857,602
WINDSHIELD FRAME
Filed Jan. 5, 1931   2 Sheets-Sheet 1
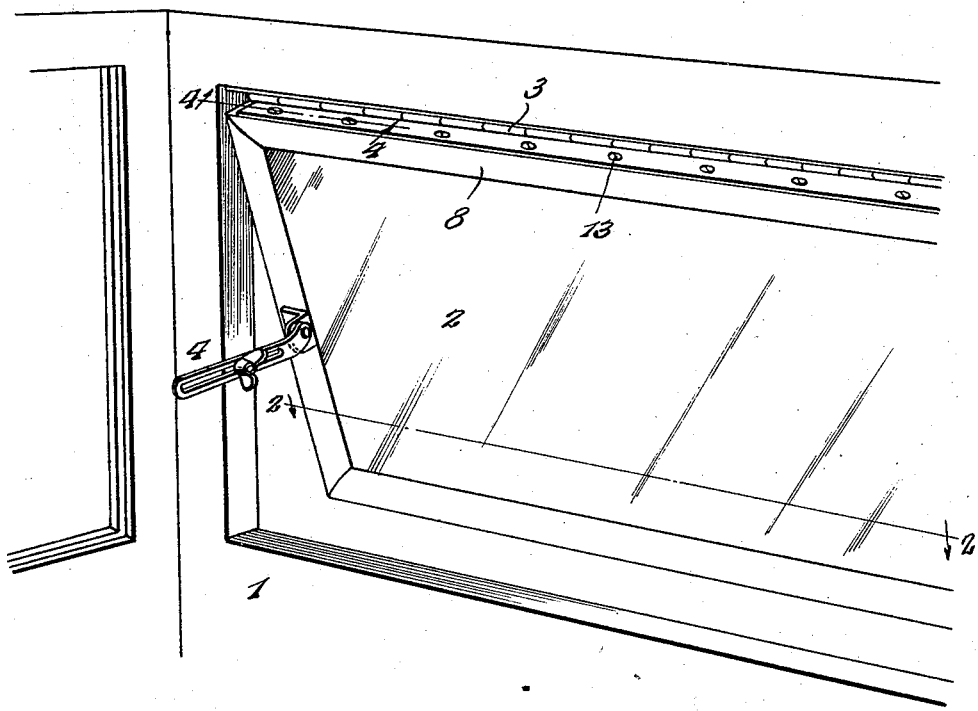
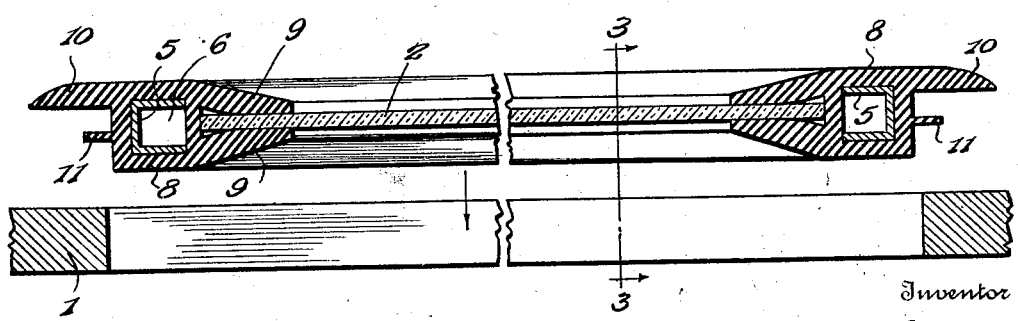
Inventor
B. A. Obst.
By Lacey & Lacey, Attorneys

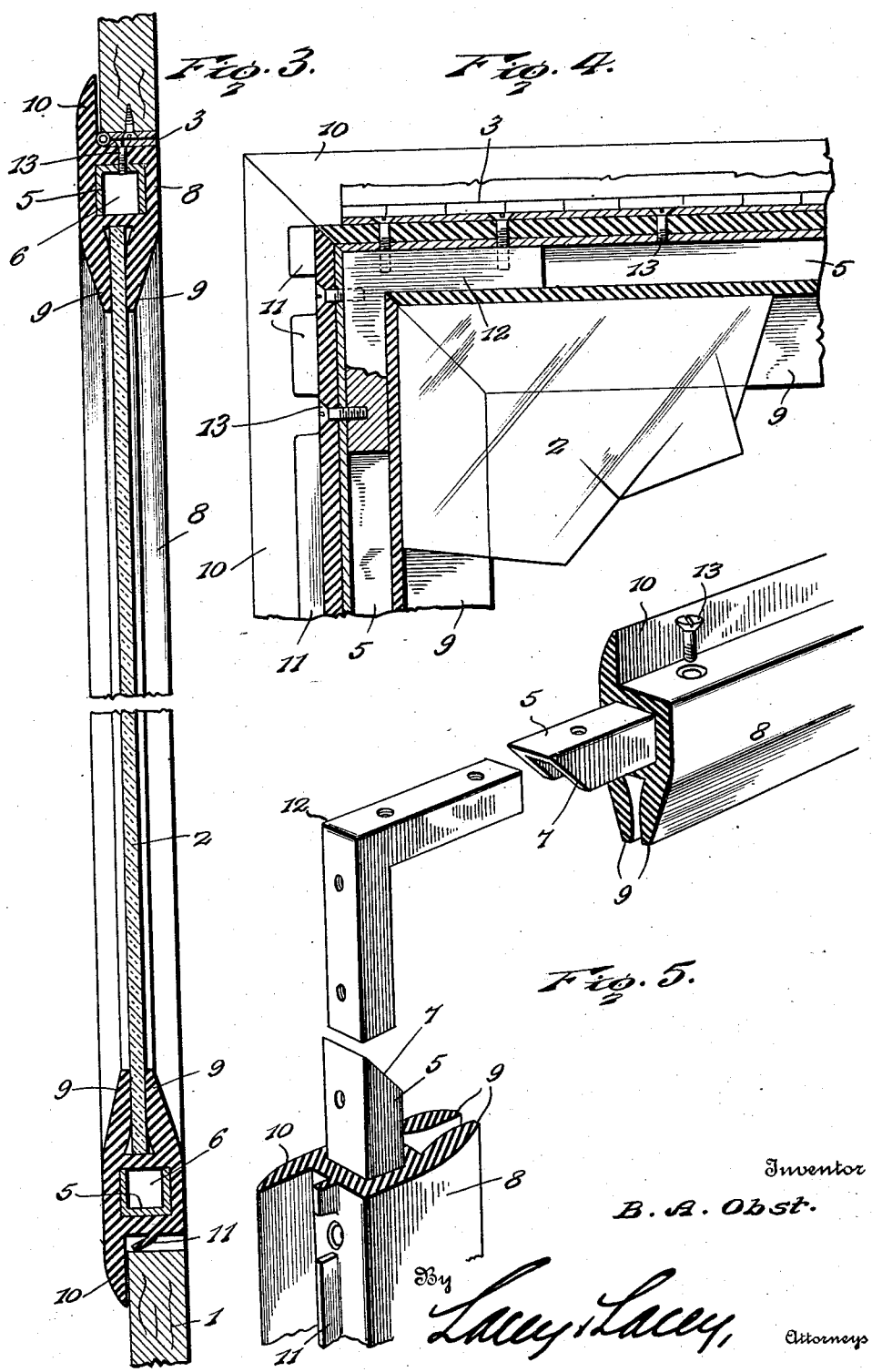

Patented May 10, 1932

1,857,602

UNITED STATES PATENT OFFICE

BRUNO A. OBST, OF MILWAUKEE, WISCONSIN

WINDSHIELD FRAME

Application filed January 5, 1931. Serial No. 506,727.

This invention has for its object the provision of a frame for windshields and windows, which will be inexpensive, easily applied to the window or windshield, and effectually prevent rattling and exclude wind and water. An embodiment of the invention, applied to the windshield of a motor vehicle, is illustrated in the accompanying drawings, and the invention resides in certain novel features which will be hereinafter first fully described and then more particularly defined in the appended claims.

In the drawings:

Figure 1 is a perspective view showing a portion of a windshield having the invention applied thereto, and showing the windshield as it appears when mounted in an automobile.

Figure 2 is a horizontal section on the line 2—2 of Figure 1,

Figure 3 is a vertical section on the line 3—3 of Figure 2, the windshield being shown in closed position, Figure 4 is an enlarged section through a corner of the windshield and frame on the line 4—4 of Figure 1, and Figure 5 is a perspective view of a corner of the frame showing the parts disassembled but in their respective relative positions.

In the drawings, the reference numeral 1 indicates a portion of an automobile cab having an opening formed therein to receive the windshield. The windshield comprises a pane of glass 2 and a frame fitted to the several edges of the glass and connected to the top of the windshield opening by a long continuous hinge 3 of the type known commercially as piano hinges. These hinges are characterized by leaves which extend the full length of the article to which they are applied, which leaves have alternating eyes arranged at intervals, through which is inserted a pintle or hinge pin, as will be understood upon reference to Figs. 1 and 3. There is also indicated at 4 a holding bracket or arm of well known type, by which the windshield may be held in its opened position. The frame in which the glass pane 2 is mounted is formed, according to the present invention, of rubber molded into tubular form and having a steel channel bar 5 inserted through its bore 6 and extending from end to end of the same, the ends of the channel bar being mitered, as shown most clearly at 7 in Figure 5. The molded rubber tube 8 has also mitered ends, as shown in Figure 1, whereby meeting sections of the tubular rubber frame may be joined at right angles. At one side of the bore 6 of the frame there are flanges 9 which converge toward their outer free edges whereby they are adapted to fit against opposite sides of the pane 2, as clearly shown in Figs. 2 and 3, and resiliently grasp the pane so that it will be firmly held and all rattling of the glass will be eliminated. At the opposite side of the bore 6, which is the outer edge of the frame, at the front side of the frame there is a sealing flange 10 which is adapted to fit against the outer side of the car frame, as shown most clearly in Fig. 3, and approximately on the medial longitudinal line of the frame at the outer side of the bore is a single relatively thin lip 11 which extends longitudinally of the frame and is adapted to bear against the wall of the windshield opening, as shown most clearly in Figure 3, the engagement of the lip with the frame causing the lip to flex so that it will fit snugly between the windshield frame and the wall of the windshield opening and will thereby very effectually exclude wind and the weather elements. The channels 5 impart rigidity to the rubber tubular frame so that it will fit neatly to the glass and will present a sightly appearance, and to reinforce the corners of the frame and securely couple the meeting ends of the several frame members, I provide right angular coupling brackets 12 which are solid bars of metal, having their two end portions disposed at a right angle to each other and of such dimensions as to fit closely within the meeting ends of the channel bars 5. This arrangement is shown clearly in Figure 4, and it will be noted that openings are provided through the rubber frame and through the channel bars so that fastening screws or bolts 13 may be inserted therethrough to enter sockets provided therefor in the coupling blocks and thereby firmly secure all the parts in proper assembled relation. It will also be noted, with reference particularly to Figure 5, that openings are formed through the tubular rubber frame to permit fastening screws to be inserted through the hinge leaves and the rubber frame to engage openings in top channel bar 5 so that the hinge will be very firmly secured in position. It will be noted that the inner wall of the bore 6 forms, in effect, a flexible diaphragm and inasmuch as the open side of the channel bar is presented to said diaphragm and bears thereagainst on opposite sides of the window glass, said diaphragm will receive and absorb any jar or vibration imparted to the glass incident to riding over rough or uneven roads. Furthermore, the hollow construction of the channel bar imparts the desired rigidity to the elastic frame without materially increasing its weight so as to render it very easy for a person to open and shut the frame.

The rubber frame, by reason of its natural elasticity or resiliency, will very effectually absorb vibration and thereby eliminate the rattle which is frequently noticed nowadays about the windshields of automobiles and which is frequently exceedingly annoying to the chauffeur and to the passengers. The channel bars will provide the necessary rigidity to maintain the proper shape of the frame without materially increasing its weight and, as they are completely housed within the outer rubber frame, moisture cannot reach them and rusting or corroding is prevented. The right angular corner coupling blocks very effectually prevent distortion of the frame, and the lips 11 and flanges 10 so engage the frame of the car that wind and water will be excluded, and the comfort of the occupants of the vehicle will be enhanced. While the invention is particularly advantageous for application to windshields, it is not confined to that particular use, and it may be applied to windows of vehicles and of buildings and especially to casement windows. A coloring matter may be applied to the surface of the frame so that it will harmonize with the finish of the vehicle or building to which it is applied, and the invention may be applied to any window or analogous structure at a very low cost.

Having thus described the invention, I claim:

1. A cushioning member for windshields and analogous structures comprising a frame formed of elastic material having a continuous opening therein entirely surrounding the frame and defining a flexible diaphragm facing the inner portion thereof, said frame being provided at said diaphragm with integral inwardly extending converging flanges adapted to bear against opposite sides of a window glass with the edge of the glass bearing against the adjacent side of the diaphragm, the frame being further provided with a circumferential outwardly extending sealing flange and a single flexible lip of less length and thickness than the sealing flange and extending laterally from the frame in spaced relation to said sealing flange, and reinforcing channel bars housed within the opening of the frame and having their open sides presented to the diaphragm and their edges at said open side bearing against the diaphragm on opposite sides of the window glass whereby the diaphragm will receive and absorb any shock or vibration imparted to the window glass.

2. A cushioning member for windshields and analogous structures comprising a substantially rectangular frame formed of elastic material having a continuous opening therein entirely surrounding the frame and defining a flexible diaphragm facing the inner portion of said frame, the frame being provided at said diaphragm with integral inwardly extending converging flanges adapted to bear against opposite sides of a window glass with the edge of the glass bearing against the adjacent side of said diaphragm, the frame being further provided with a circumferential outwardly extending sealing flange and a single flexible lip of less length and thickness than the sealing flange and extending laterally from the frame in spaced relation to said sealing flange, portions of the lip being cut away to permit the passage of fastening devices, reinforcing channel bars housed within the opening of the frame and having their open sides presented to the diaphragm and their edges at said open side bearing against the diaphragm on opposite sides of said window glass, solid angle bars housed within the channel bars at the corners of the frame, and fastening devices extending through the frame and closed sides of the angle bars at the openings in the flexible lip and engaging the solid angle bars.

In testimony whereof I affix my signature.

BRUNO A. OBST. [L. S.]